(12) United States Patent
Tanamoto et al.

(10) Patent No.: US 10,218,518 B2
(45) Date of Patent: Feb. 26, 2019

(54) AUTHENTICATION SERVER, AUTHENTICATION SYSTEM, AND AUTHENTICATION METHOD

(71) Applicant: Kabushiki Kaisha Toshiba, Minato-ku (JP)

(72) Inventors: Tetsufumi Tanamoto, Kawasaki (JP); Shinichi Yasuda, Setagaya (JP); Satoshi Takaya, Kawasaki (JP); Masafumi Mori, Yokkaichi (JP); Takao Marukame, Chuo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 187 days.

(21) Appl. No.: 15/443,228

(22) Filed: Feb. 27, 2017

(65) Prior Publication Data

US 2018/0076965 A1    Mar. 15, 2018

(30) Foreign Application Priority Data

Sep. 12, 2016   (JP) .................................. 2016-177993

(51) Int. Cl.
*H04L 9/32* (2006.01)
*H04L 29/06* (2006.01)

(52) U.S. Cl.
CPC ........ *H04L 9/3278* (2013.01); *H04L 63/0876* (2013.01)

(58) Field of Classification Search
CPC .................................................... H04L 9/3278
See application file for complete search history.

(56) References Cited

U.S. PATENT DOCUMENTS

| 8,583,710 B2 | 11/2013 | Bucci et al. |
| 8,854,866 B2 | 10/2014 | Huber et al. |
| (Continued) | | |

FOREIGN PATENT DOCUMENTS

| JP | 2000-235636 | 8/2000 |
| JP | 2005-523481 | 8/2005 |
| (Continued) | | |

OTHER PUBLICATIONS

Delvaux J et al., (Secure Lightweight Entity Authentication with Strong PUFs: Mission Impossible? CHESS 2014, 18 pages, 2014) (Year: 2014).*

(Continued)

*Primary Examiner* — Oleg Korsak
(74) *Attorney, Agent, or Firm* — Oblon, McClelland, Maier & Neustadt, L.L.P.

(57) ABSTRACT

An authentication server according to embodiments performs statistical processing on a plurality of pieces of ID data acquired from an electronic device including a PUF circuit generating the pieces of ID data (S1052 to S1071), determines whether the plurality of pieces of ID data are physical random numbers based on a result of the statistical processing (S1072), and when the plurality of pieces of ID data are determined to be physical random numbers, recognizes the result of authentication of the electronic device as a success of authentication (S1073), and when the plurality of pieces of ID data are determined not to be physical random numbers, recognizes a result of authentication of the electronic device as a failure of authentication (S1074).

9 Claims, 10 Drawing Sheets

(56) References Cited

U.S. PATENT DOCUMENTS

| | | | |
|---|---|---|---|
| 9,088,278 | B2 | 7/2015 | Pfeiffer et al. |
| 2003/0204743 | A1 | 10/2003 | Devadas et al. |
| 2009/0083833 | A1* | 3/2009 | Ziola .................. G06F 21/31 726/2 |
| 2014/0327468 | A1* | 11/2014 | Pfeiffer ............... H03K 19/003 326/8 |
| 2015/0071430 | A1 | 3/2015 | Zhu et al. |
| 2015/0071432 | A1 | 3/2015 | Zhu et al. |
| 2015/0312047 | A1 | 10/2015 | Suzuki |
| 2016/0085961 | A1 | 3/2016 | Tanamoto et al. |
| 2016/0277025 | A1 | 9/2016 | Tanamoto et al. |
| 2016/0330023 | A1 | 11/2016 | Tanamoto et al. |
| 2017/0149573 | A1* | 5/2017 | Sadhasivan ............ G06F 21/14 |

FOREIGN PATENT DOCUMENTS

| | | |
|---|---|---|
| JP | 2012-73954 | 4/2012 |
| JP | 2015-127757 | 7/2015 |
| JP | 2015-207214 | 11/2015 |
| JP | 5863994 | 2/2016 |
| JP | 2016-63457 | 4/2016 |
| JP | 2016-174279 | 9/2016 |

OTHER PUBLICATIONS

Devadas et al., (Design and Implementation of PUF-Based "Unclonable" RFID ICs for Anti-Counterfeiting and Security Applications, 2008 IEEE, 7 pages, 2008) (Year: 2008).*

Andrew Rukhin et al., "A Statistical Test Suite for Random and Pseudorandom Number Generators for Cryptographic Applications," National Institute of Standards and Technology, Technology Administration U.S. Department of Commerce, Special Publication 800-22, Revision 1a, http://csrc.nist.gov/publications/nistpubs/800-22-rev1a/SP800-22rev1a.pdf, pp. 121.

Yevgeniy Dodis et al. "Fuzzy Extractors: How to Generate Strong Keys from Biometrics and Other Noisy Data," EUROCRYPT 2004, LNCS 3027, 2004, pp. 18.

Jorge Guajardo et al. "FPGA Intrinsic PUFs and Their Use for IP Protection," CHES 2007, LNCS 4727, 2007, pp. 18.

* cited by examiner

```
                                    NUMBER
                                    D1 OF "1"
                                    (REFER-
                                    ENCE
 REGIS-                             VALUE)
 TERED ID : 1 0 0 1 0 1 0 1 0 1  ⇒    6
```

|  |  | NUMBER<br>D0 OF "1" | INDEX<br>VALUE | REPLACE-<br>MENT<br>VALUE | EVALUA-<br>TION<br>TARGET<br>VALUE |
|---|---|---|---|---|---|
| ID DATA NUMBER | | | | | |
| #1 | : 1 0 0 1 0 1 0 1 1 0 0 0 | ⇒ 5 | ⇒ 0 | ⇒ -1 | ⇒ -1 |
| #2 | : 1 0 1 1 0 1 1 1 0 1 0 0 | ⇒ 7 | ⇒ 1 | ⇒ 1 | ⇒ 0 |
| #3 | : 1 0 0 1 1 1 0 1 0 1 1 1 | ⇒ 8 | ⇒ 1 | ⇒ 1 | ⇒ 1 |
| #4 | : 1 1 0 1 0 1 0 1 0 1 0 1 | ⇒ 7 | ⇒ 1 | ⇒ 1 | ⇒ 2 |
| #5 | : 0 0 0 0 1 0 1 0 1 0 1 0 | ⇒ 4 | ⇒ 0 | ⇒ -1 | ⇒ 1 |
| ⋮ | ⋮ ⋮ | ⇒ ⋮ | ⇒ ⋮ | ⇒ ⋮ | ⇒ ⋮ |
| | (a) | (b) | (c) | (d) | (e) |

FIG.9

RO-PUF1 : P=1.000000 *Prev : 0.29,0.17,0.019,0.019,0.175,0.294,  
RO-PUF2 : P=1.000000 *Prev : 0.31,0.19,0.025,0.025,0.196,0.31,  
RO-PUF3 : P=1.000000 *Prev : 0.31,0.19,0.025,0.025,0.196,0.31,  
RO-PUF4 : P=1.000000 *Prev : 0.31,0.19,0.025,0.025,0.196,0.31,  
RO-PUF5 : P=0.681137 *Prev : 0.40,0.28,0.061,0.108,0.354,0.47,  
RO-PUF6 : P=1.115559 *Prev : 0.00,0.00,0.000,0.000,0.000,0.00,  
RO-PUF7 : P=1.000000 *Prev : 0.31,0.19,0.025,0.025,0.196,0.31,     } P>0.1  
RO-PUF8 : P=1.000000 *Prev : 0.31,0.19,0.025,0.025,0.196,0.31,  
RO-PUF9 : P=1.000000 *Prev : 0.31,0.19,0.025,0.025,0.196,0.31,  
RO-PUF10 : P=1.000000 *Prev : 0.31,0.19,0.025,0.025,0.196,0.31,  
RO-PUF11 : P=1.000000 *Prev : 0.31,0.19,0.025,0.025,0.196,0.31,  
RO-PUF12 : P=1.000000 *Prev : 0.31,0.19,0.025,0.025,0.196,0.31,

FIG.10

RO-PUF1 : P=0.000004 *Prev : 0.00,0.00,0.00,0.00,0.00,0.00,  
RO-PUF2 : P=0.000016 *Prev : 0.00,0.00,0.00,0.00,0.00,0.00,  
RO-PUF3 : P=0.000016 *Prev : 0.00,0.00,0.00,0.00,0.00,0.00,  
RO-PUF4 : P=0.000016 *Prev : 0.00,0.00,0.00,0.00,0.00,0.00,  
RO-PUF5 : P=0.000016 *Prev : 0.00,0.00,0.00,0.00,0.00,0.00,  
RO-PUF6 : P=0.000016 *Prev : 0.00,0.00,0.00,0.00,0.00,0.00,  
RO-PUF7 : P=0.000016 *Prev : 0.00,0.00,0.00,0.00,0.00,0.00,     } P TO 0.0  
RO-PUF8 : P=0.000016 *Prev : 0.00,0.00,0.00,0.00,0.00,0.00,  
RO-PUF9 : P=0.000016 *Prev : 0.00,0.00,0.00,0.00,0.00,0.00,  
RO-PUF10 : P=0.000016 *Prev : 0.00,0.00,0.00,0.00,0.00,0.00,  
RO-PUF11 : P=0.000043 *Prev : 1.00,1.00,1.00,0.47,0.68,0.75,  
RO-PUF12 : P=0.000016 *Prev : 0.00,0.00,0.00,0.00,0.00,0.00,

AUTHENTICATION SERVER, AUTHENTICATION SYSTEM, AND AUTHENTICATION METHOD

CROSS-REFERENCE TO RELATED APPLICATIONS

This application is based upon and claims the benefit of priority from Japanese Patent Application No. 2016-177993, filed on Sep. 12, 2016; the entire contents of which are incorporated herein by reference.

FIELD

Embodiments described herein relate generally to an authentication server, an authentication system, and an authentication method.

BACKGROUND

In recent years, with the improvement of communication speed and the progress of cloud computing, the use of Near Field Communication (NFC) has been rapidly increasing. The NFC is commonly used for not only an IC card such as a cash card and a credit card, but also for electronic money stored in a smartphone and a smart card used as, for example, a ticket for train, bus, and the like. For the NFC, enhancement of security in an ID identification function for identifying an individual has been a problem. Furthermore, in recent years, an ID identification function is also incorporated in, for example, a memory card that has been used only to store individual data therein, and therefore, high-speed processing of the ID identification function in a portable device has become a technical problem. Under such circumstances, research and development for using variations among individual devices as "chip fingerprint" have been conducted. This technique is known as a Physically Unclonable Function (PUF).

Among PUFs, SRAM (Static Random Access Memory)-PUF is most widely studied recently. The SRAM-PUF is a technique using manufacturing variations between two inverters constituting an SRAM. In this technique, the RAM-PUF, which is the most widespread type of PUF, has been applied to devices such as security IPs and IC cards. Further, as a proposal to use initial variations among electronic devices, application of the RAM-PUF to a non-volatile memory is also under consideration.

BRIEF DESCRIPTION OF THE DRAWINGS

FIG. 9 is a diagram illustrating an example of test results when an FPGA having generated a registered ID matches an FPGA having generated ID data in the first embodiment;

FIG. 10 is a diagram illustrating an example of test results when an FPGA having generated a registered ID does not match an FPGA having generated ID data in the first embodiment;

DETAILED DESCRIPTION

Figure 1:
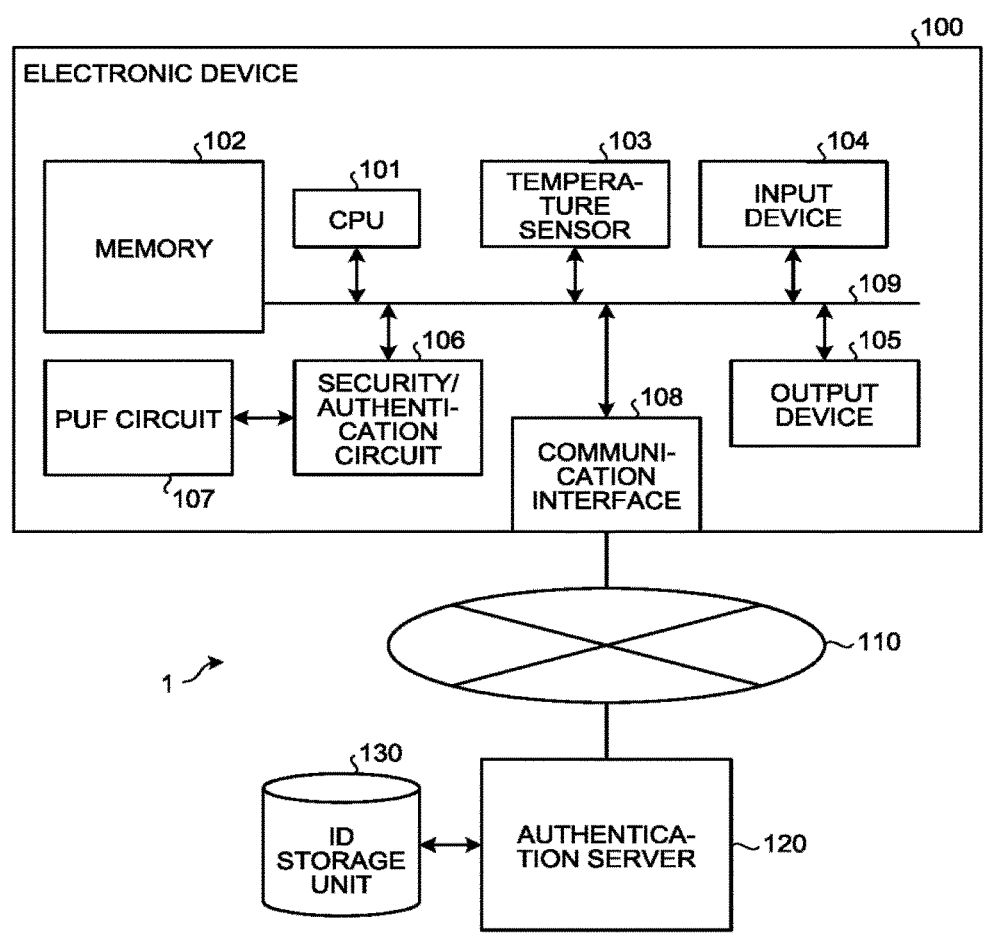
FIG. 1 is a block diagram illustrating a schematic configuration example of an authentication system including an electronic device according to a first embodiment.

An authentication server, an authentication system, and an authentication method according to exemplary embodiments will be explained below in detail with reference to the accompanying drawings.

PUFs that use variations among devices in a natural way are said to be an ultimate ID generating technique. In a PUF, normally, a device generates a value (data) in response to a challenge signal from a server or the like based on a physical phenomenon, and the generated value (data) is returned to the server as a response signal. In such a mechanism where a value (data) is generated by a measurement based on a physical phenomenon, an ID obtained from the generated value (data) is affected by the temperature, noise environment, and the like during the measurement. Therefore, the obtained ID varies around a certain value (hereinafter, "central value"). Therefore, conventionally, there have been made attempts such as generating a plurality of IDs and deciding a majority among them to enhance the reliability of the ID, or providing a feedback circuit in an Application Specific Integrated Circuit (ASIC) or the like to enhance the reproductivity of IDs.

To explain more specifically, in the method of deciding a majority, a device measures pieces of data repeatedly, and a server determines that a piece of data that occurs most frequently among the pieces of data obtained by the repeated measurements is the corresponding ID. Generally, in the method of deciding a majority, the accuracy of ID certification is increased as the number of repetitions, that is, the number of data samples becomes larger. However, because a time period required for ID authentication becomes longer when the number of repetitions is increased, normally, an upper limit is set on the number of repetitions is set. For example, if a time period of about 1 microsecond is required for one measurement, the upper limit of the number of repetitions is 1,000 in order to limit the time period for authentication within 1 millisecond.

Meanwhile, in the method of providing a feedback circuit, it is possible to reduce the effects of external disturbance on the data measured by a device, thereby enhancing the robustness of the data. However, because a commonly used feedback circuit is an analog circuit, there is a risk that the design cost thereof is increased significantly. There are also cases where the feedback circuit cannot be implemented on a relatively low cost Field-Programmable Gate Array (FPGA) or the like in which the PUF is expected to be frequently used.

Accordingly, in the following embodiments, there are described examples of an authentication server, an authentication system, and an authentication method that can authenticate an ID with high accuracy using a relatively small number of pieces of data for majority decision, by evaluating distribution of pieces of data (for example, distribution of values based on differences) acquired by a device with respect to an ID already registered (hereinafter, "registered ID"). In the following embodiments, for example, dynamic behaviors of pieces of data for majority decision are used. Specifically, when a registered ID matches an ID of a target device, pieces of data acquired by the target device are supposed to vary around a central value. Furthermore, because the measurement in the device is a physical measurement, this variation is supposed to be a truly random variation. Therefore, when statistical behaviors of the variation are measured and if those behaviors indicate natural random numbers, it is possible to authenticate that the pieces of data obtained by this device match the registered ID. In order to determine the randomness of the pieces of data, for example, a simple test related to a random walk can be used. In this case, ID authentication can be performed simply and quickly.

First Embodiment

First, an authentication server, an authentication system, and an authentication method according to a first embodiment are described in detail below with reference to the drawings.

FIG. 1 is a block diagram illustrating a schematic configuration example of an authentication system including an electronic device according to the first embodiment. As illustrated in FIG. 1, an authentication system 1 has a configuration in which an electronic device 100 and an authentication server 120 are communicably connected via a network 110. The network 110 can be a network of various types, such as the Internet or a wired or wireless Local Area Network (LAN).

The electronic device 100 has a Central Processing Unit (CPU) 101, a memory 102, a temperature sensor 103, an input device 104, an output device 105, a security/authentication circuit 106, a PUF circuit 107, and a communication interface 108. The CPU 101, the memory 102, the temperature sensor 103, the input device 104, the output device 105, the security/authentication circuit 106, and the communication interface 108 are connected to each other via an internal bus 109, for example.

The CPU 101 is a control unit that controls the respective elements in the electronic device 100. The input device 104 is configured to include, for example, input devices, such as a keyboard, a mouse, and the like. The output device 105 is configured to include, for example, a display for displaying information input from the CPU 101 and the like to a user, and an external interface for outputting information to external devices such as a printer and an external storage unit. The communication interface 108 is a communication interface that can establish communication with the authentication server 120 via the network 110, and the communication interface 108 inputs information received from the authentication server 120 to the CPU 101 via the internal bus 109 and also transmits information input from the CPU 101 to the authentication server 120 via the network 110.

The security/authentication circuit 106 instructs the PUF circuit 107 to generate and output an ID based on, for example, a command from the CPU 101. Further, the security/authentication circuit 106 inputs information of an ID and the like acquired from the PUF circuit 107 to the CPU 101.

The PUF circuit 107 is constituted by, for example, a ring oscillator or a Magnetic Tunnel Junction (MTJ) device, and the PUF circuit 107 generates and measures a piece of data corresponding to the ID (hereinafter, "piece of ID data") according to the instruction from the security/authentication circuit 106, and then returns the measured piece of ID data (hereinafter, also "measured ID") to the security/authentication circuit 106. The PUF circuit 107 can be constituted by a chip different from the memory 102, or can be incorporated in the memory 102. Alternatively, the memory 102 can be a storage device that is constituted by an SRAM or the like.

Meanwhile, the authentication server 120 is a server provided on the network 110, and the authentication server 120 performs authentication of the electronic device 100 in response to a request from the electronic device 100. The authentication server 120 is connected to an ID storage unit 130 in which an ID notified from the electronic device 100 in advance is registered. The authentication server 120 collates the ID registered in the ID storage unit 130 with ID data notified from the electronic device 100, thereby performing authentication of the electronic device 100. The ID storage unit 130 can be a storage unit incorporated in or externally attached to the authentication server 120, or can be a storage area of a file system or the like provided on the network 110.

First, in a schematic flow of authentication, the authentication server 120 transmits a command (a challenge signal) for starting authentication to the electronic device 100 in response to an authentication request from the electronic device 100. In response to the challenge signal, the PUF circuit 107 of the electronic device 100 generates pieces of ID data. The generated pieces of ID data are extracted by the authentication server 120 via the network 110 (a response), and used for authentication in the authentication server 120. The result of authentication by the authentication server 120 is notified to the electronic device 100 via the network 110.

Next, authentication according to the first embodiment is described in more detail. Although authentication exemplified below corresponds to a general challenge/response method, the authentication is not limited to this method.

In authentication according to the first embodiment, the authentication server 120 acquires a plurality of pieces of ID data from the electronic device 100, and evaluates a distribution of the acquired plurality of pieces of ID data with respect to a registered ID, thereby performing authentication of the electronic device 100. Due to this configuration, it becomes possible to perform highly accurate ID authentication using a relatively small number of pieces of data for majority decision (the plurality of pieces of ID data).

Specifically, for example, an authentication request is transmitted from the electronic device 100 to the authentication server 120, based on an operation by a user as a trigger. The authentication server 120 having received the authentication request transmits a challenge signal that is a command for generating ID data or starting authentication to the electronic device 100. The challenge signal includes a code that enables the authentication server 120 to read ID data from the electronic device 100. The CPU 101 of the electronic device 100 having received the challenge signal outputs a command for generating ID data to the security/ authentication circuit 106. The security/authentication circuit 106 accesses the PUF circuit 107 according to the generation command for causing the PUF circuit 107 to generate ID data, and acquires the generated ID data from the PUF circuit 107. The ID data acquired by the security/authentication circuit 106 is transmitted, as a response signal, to the authentication server 120 on the network 110 by the CPU 101 having executed the code included in the challenge signal. Due to this configuration, the ID data generated in the electronic device 100 is extracted by the authentication server 120. Extraction (a response) of the ID data by the authentication server 120 is repeated a predetermined number of times. Due to this configuration, the authentication server 120 acquires a plurality of pieces of ID data from the electronic device 100.

The authentication server 120 evaluates a distribution (for example, a distribution of values based on differences) of the plurality of pieces of data extracted from the electronic device 100, thereby performing authentication of the electronic device 100. An example of a specific evaluation method is described below while exemplifying a case where an ID has 12 bits.

Figures 2, 3:
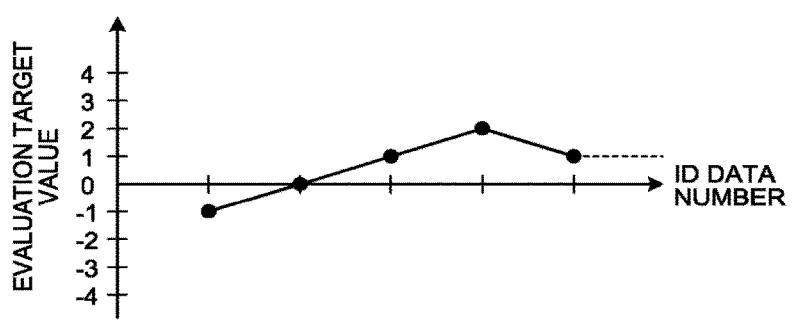
FIG. 2 is an explanatory diagram of examples of processes in statistical processing according to the first embodiment.
FIG. 3 is a diagram illustrating an example of behaviors of evaluation target values calculated in the first embodiment.

In the evaluation of the distribution of the plurality of pieces of ID data, a registered ID, which has been registered in the ID storage unit 130 in advance in association with, for example, identification information of the electronic device 100, is used as an evaluation reference. (a) in FIG. 2 illustrates an example of a case where it is assumed that the registered ID is "100101010101", the pieces of ID data extracted from the electronic device 100 includes ID data #1: 100101011000, ID data #2: 101101110100, ID data #3: 100111010111, ID data #4: 110101010101, ID data #5: 000010101010, and so on. It is assumed that the measurements of the pieces of ID data in the electronic device 100 are repeated ten or more times, although the number of repetitions depends on the characteristics and the like of the PUF circuit 107.

ID data to be generated in response to the challenge signal from the authentication server 120 changes over time due to the physical environment in which the electronic device 100 is located. For example, the ID data changes when it is affected by an electromagnetic field or the like around the electronic device 100. In this case, if the registered ID of the electronic device 100 is "100101010101", ID data included in a response signal transmitted from the electronic device 100 is supposed to vary randomly around the registered ID ("100101010101"). Accordingly, in the first embodiment, a distribution of the plurality of received pieces of ID data (for example, a distribution of differences) with respect to the registered ID are analyzed and evaluated, and if, as a result, it is recognized that the plurality of pieces of ID data are physical random numbers (also referred to as "true random numbers") around the registered ID, the electronic device 100 is authenticated to be legitimate.

First Evaluation Method

In a first evaluation method exemplified below, the number of bits of each piece of ID data (a Hamming distance) that differ with respect to a registered ID is counted. If the electronic device 100 having generated a plurality of pieces of ID data is the same as an electronic device associated with the registered ID, the Hamming distance counted as described above is supposed to be distributed randomly around "0". In this case, when the counted Hamming distance and the number of occurrences are plotted along the horizontal axis and the vertical axis, respectively, a normal distribution is supposed to be obtained. Accordingly, in the first embodiment, the normality of the distribution obtained in this manner is tested, thereby evaluating whether the plurality of pieces of ID data are physical random numbers around the registered ID, and determining (authenticating) whether the electronic device 100 is legitimate based on this evaluation result. As the normality test of the distribution, for example, the D'Agostino's test based on skewness, the D'Agostino's test based on kurtosis, the omnibus test based on skewness and kurtosis, the Kolmogorov-Smirnov test, and the Shapiro-Wilk test can be used.

Second Evaluation Method

As a second evaluation method, there is exemplified a method of defining the number of bit values "1" included in each piece of ID data as D0, defining the number of bit values "1" included in a registered ID as D1, comparing the number D0 with the number D1, and evaluating, based on the comparison result, whether a plurality of pieces of ID data are physical random numbers around the registered ID.

When a registered ID and pieces of ID data illustrated in (a) in FIG. 2 are objects to be evaluated, as illustrated in (b) in FIG. 2, the number D0 of bit values "1" in a bit string of the registered ID is six. Meanwhile, the number D1 of bit values "1" in a bit string of the ID data #1 is five, the number D1 of bit values "1" in a bit string of the ID data #2 is seven, and the number D1 of bit values "1" in a bit string of the ID data #3 is eight, the number D1 of bit values "1" in a bit string of the ID data #4 is seven, and the number D1 of bit values "1" in a bit string of the ID data #5 is four. Accordingly, as it is assumed that the number D0 (D0=6) of bit values "1" in the bit string of the registered ID is used as a reference value, a value with respect to the ID data of a number D1 that is equal to or smaller than the reference value (this value is used as an index value) is set to be "0", and an index value with respect to the ID data of a number D1 that is greater than the reference value is set to be "1", as illustrated in (c) in FIG. 2, it is possible to obtain a data string of index values 0, 1, 1, 1, 0, onwards respectively, corresponding to the pieces of ID data #1 to #5 onwards.

If a replacement rule of replacing "0" with "−1" and keeping "1" as "1" without any change is applied to the data string of index values obtained in the above manner, the data string of index values of "0, 1, 1, 1, 0, . . . " is converted into a data string of values "−1, 1, 1, 1, −1, . . . " (these values are referred to as "replacement values"), as illustrated in (d) in FIG. 2. Subsequently, when computation is performed such that a sum of replacement values obtained up to that time is added to each of the replacement values in this data string, that is, when computation ($S_x=T_x+S_{x-1}$) is performed such that a sum $S_{x-1}$ obtained up to the immediately preceding replacement value $T_{x-1}$ is added to a xth replacement value $T_x$, the data string of replacement values "−1, 1, 1, 1, −1, . . . " is converted into a data string of values "−1, 0, 1, 2, 1, . . . " (these values are referred to as "evaluation target values"), as illustrated in (e) in FIG. 2.

If a source of occurrence of ID data is the same electronic device 100 as the registered ID, the occurrence frequency of each evaluation target value in the data string acquired in this manner is supposed to be a random walk, which is stochastically random. Therefore, if the source of occurrence of the ID data is the electronic device 100 associated with the registered ID, as illustrated in FIG. 3, the occurrence frequency of each evaluation target value is supposed to be always near zero, even when the number of ID data samples is increased.

In the above descriptions, although two evaluation methods of the distribution of pieces of ID data with respect to a registered ID have been exemplified, evaluation methods other than these methods can be also applied. For example, in the second evaluation method described above, although the number D0 of the bit value "1" (=6) in the bit string of the registered ID is used without any change as the reference value, a value obtained, for example, by adding a value after a decimal point (for example, 0.5) to the number D0 can be also used as the reference value. In this case, because the number D1 of the ID data can be prevented from being equal to the number D0 of the registered ID, it becomes possible to make the occurrence frequency of each evaluation target value in the data string of evaluation target values closer to zero.

Further, in determination as to whether a plurality of pieces of ID data received from the electronic device 100 are physical random numbers, it is possible to use a test method that is carried out in randomness evaluation of a general random-number generating circuit. Because such a randomness test method is a statistical test method for determining whether a random number generator work properly and it can represent the randomness of the pieces of ID data by a statistical amount, such as a P value, by performing a process that is a so-called "statistical test", it is possible to determine the randomness of the pieces of ID data quantitatively. For example, when there is a device having equal Hamming distances from two registered ID, with the above method, it is possible to compare P values obtained by regarding pieces of ID data measured repeatedly as random values, thereby quantitatively determining a closer registered ID. A specific example of the randomness test method is described later.

Figure 4:
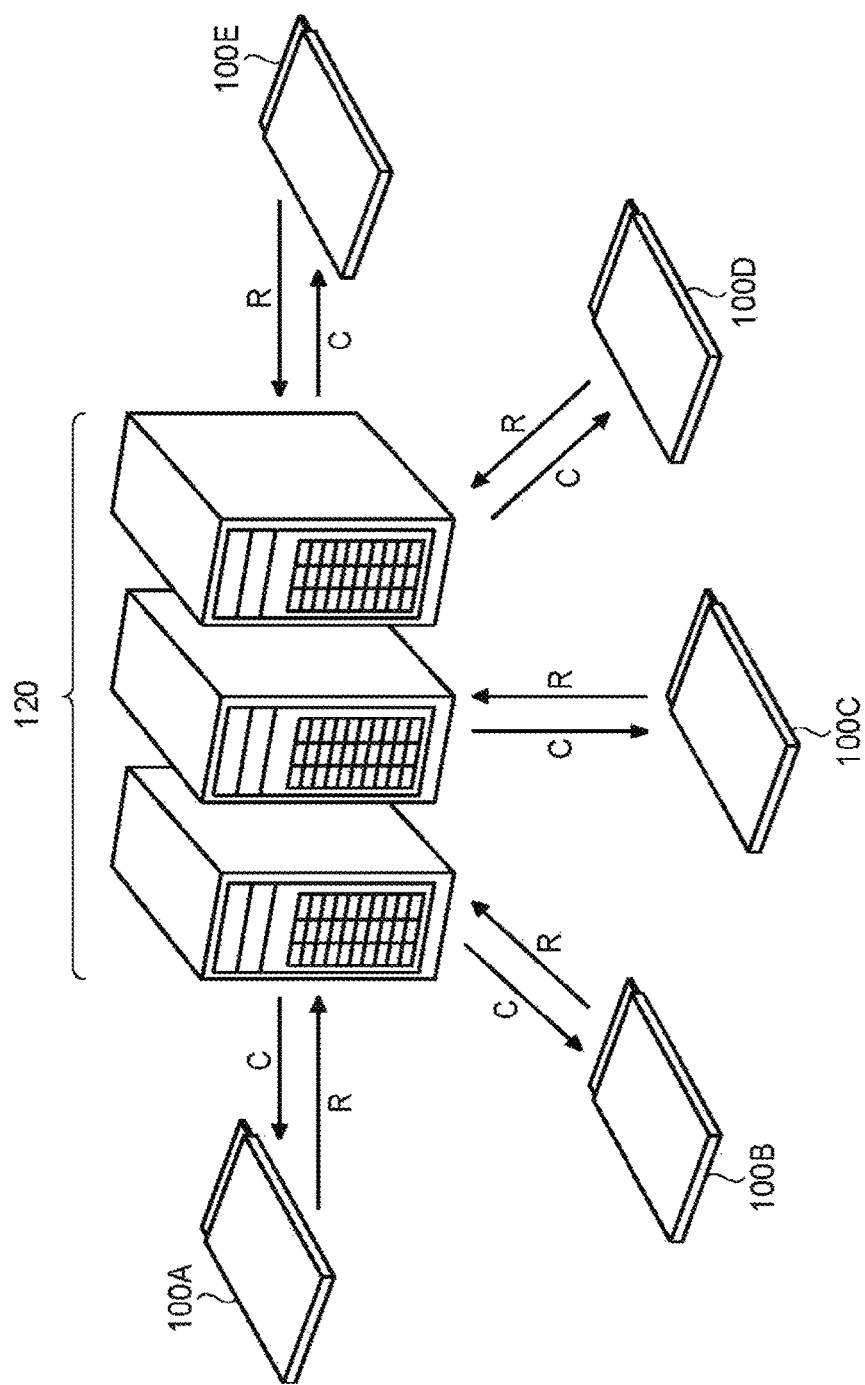
FIG. 4 is a diagram illustrating an example of a relation between a server that performs an authentication process and a plurality of electronic devices authenticated by the authentication process in the first embodiment.

FIG. 4 is a diagram illustrating an example of a relation between a server that performs an authentication process and a plurality of electronic devices authenticated by the authentication process. Each of the plurality of electronic devices 100A to 100E registers its own ID (initial registration) in the authentication server 120. The registered IDs are registered in the ID storage unit 130 connected to the authentication server 120 as registered IDs associated with the individual electronic devices 100. In the initial registration of the IDs, PUF signals (pieces of ID data) generated in the respective PUF circuits 107 of the electronic devices 100A to 100E are notified to the authentication server 120. At this time, it is possible that one PUF signal (ID) generated in the PUF circuit 107 of each of the electronic devices 100 is registered in the authentication server 120 as an ID of the corresponding electronic device 100, or a most frequent data pattern of a plurality (for example, more than 100) of PUF signals generated in the PUF circuit 107 of each of the electronic devices 100 is registered in the authentication server 120 as an ID of the corresponding electronic device 100. When the most frequent data pattern of the plurality (for example, more than 100) of PUF signals is registered in the authentication server 120 as an ID, it is also possible to register, along with this ID (registered ID), the degree of variations among the PUF signals (pieces of ID data) with respect to the most frequent data pattern using statistical parameters, such as a standard deviation. In this case, it also becomes possible to achieve more accurate ID authentication using the registered statistical parameters.

Further, at the time of authentication after completion of the initial registration, each of the electronic devices 100 transmits an authentication request to the authentication server 120 appropriately where necessary. In response to this, the authentication server 120 transmits a challenge signal C to each of the electronic devices 100. In response to the challenge signal C, each of the electronic devices 100 returns a response signal R including a piece of ID data generated in its own PUF circuit 107 to the authentication server 120. The authentication server 120 receives the response signal R for a number of times from each of the electronic device 100 to acquire a plurality of pieces of ID data, and statistically processes the distribution of the acquired pieces of ID data with respect to the registered ID, thereby performing authentication of each of the electronic devices 100.

Figure 5:
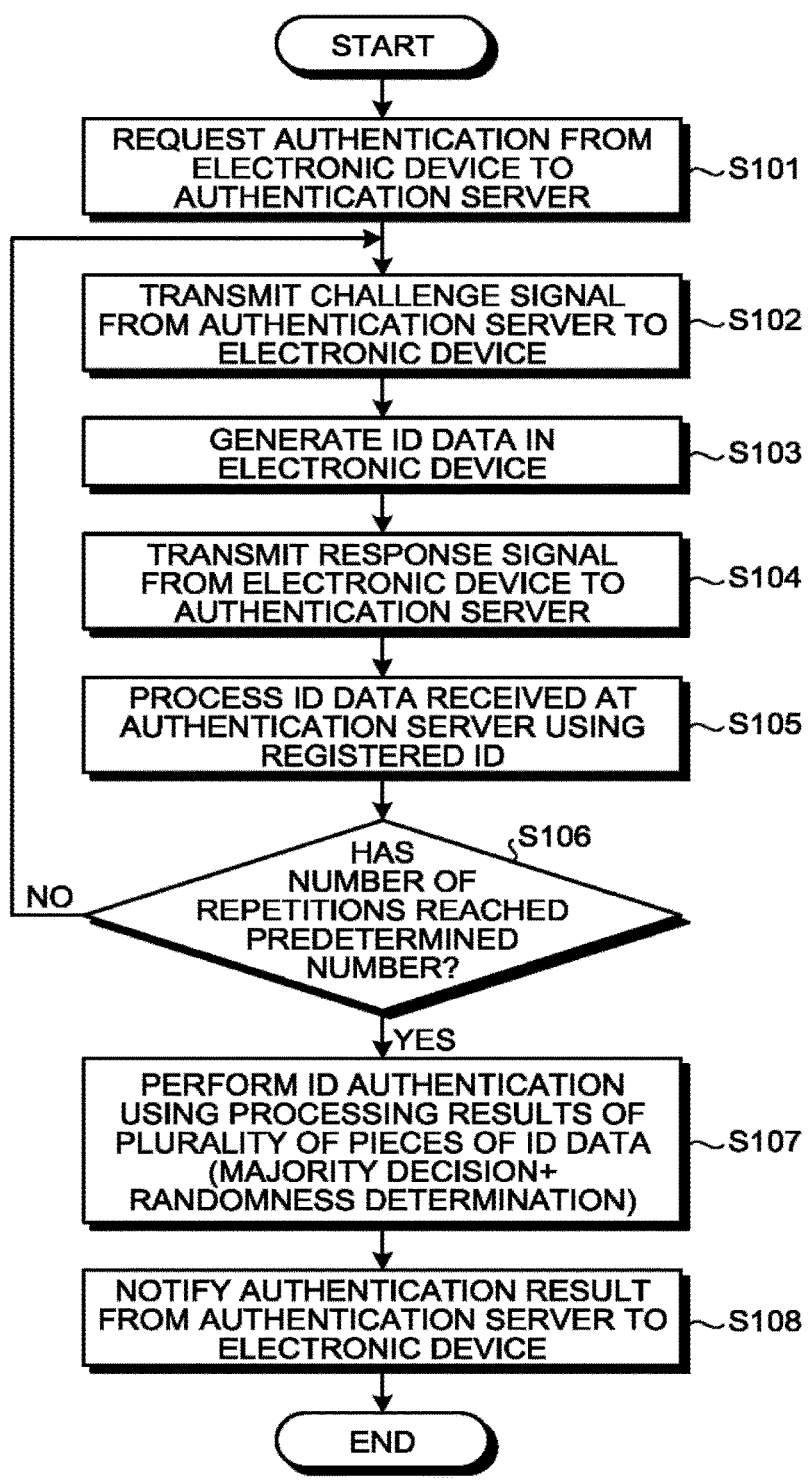
FIG. 5 is a flowchart illustrating an operation example of the authentication system according to the first embodiment.
Figure 6:
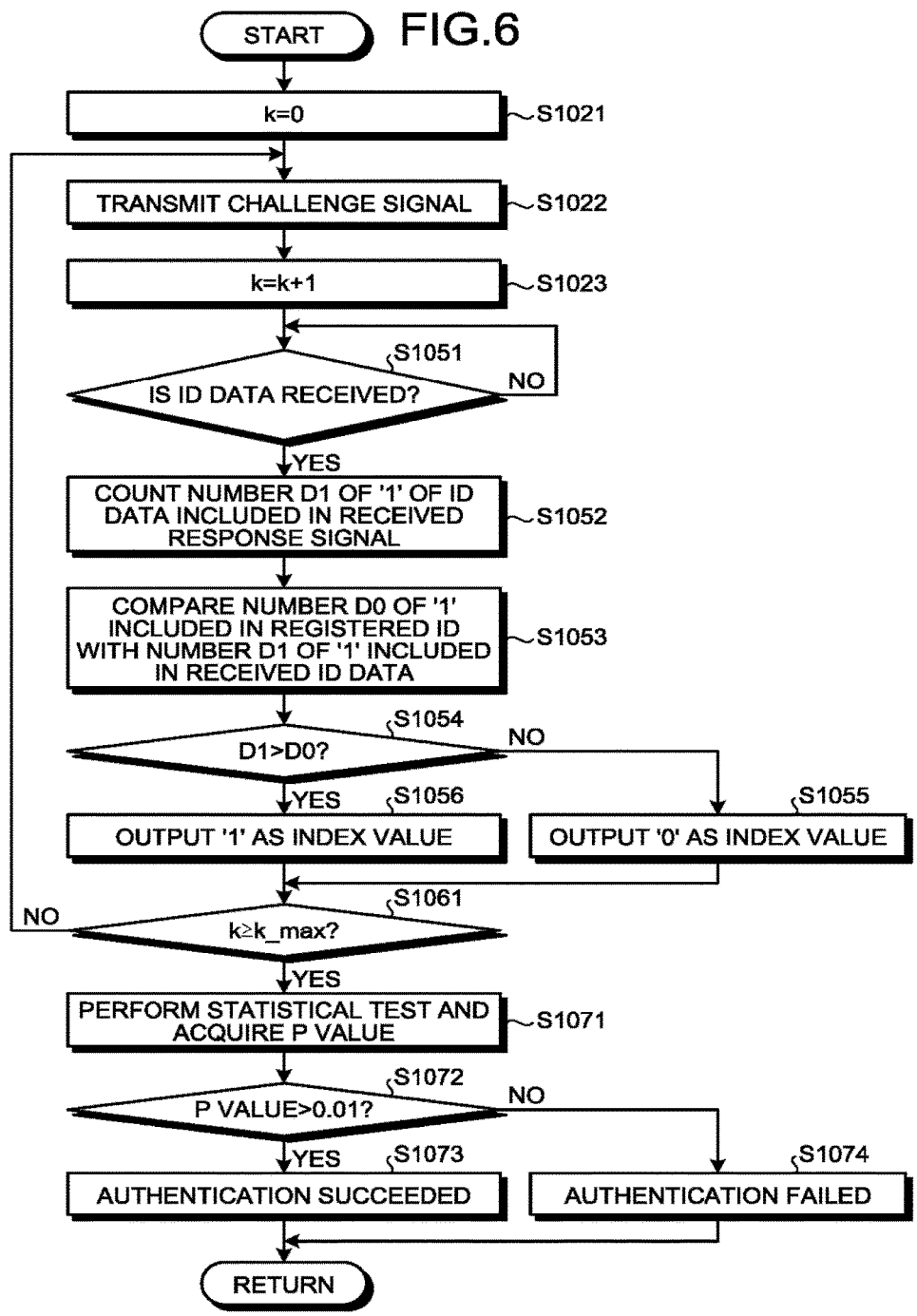
FIG. 6 is a flowchart illustrating a more specific operation example of an authentication server in operations indicated by Steps S102 to S107 in FIG. 5.

Next, more detailed operations at the time of authentication according to the first embodiment are described in detail with reference to the drawings. FIG. 5 is a flowchart illustrating an operation example of the authentication system 1 according to the first embodiment. FIG. 6 is a flowchart illustrating a more specific operation example of the authentication server 120 in operations indicated by Steps S102 to S107 in FIG. 5.

As illustrated in FIG. 5, in the operations at the time of authentication according to the first embodiment, first, the electronic device 100 transmits an authentication request to the authentication server 120 (Step S101). It is possible to configure that the authentication request is generated by the CPU 101 upon startup of the electronic device 100 or when a user inputs a certain operation to the electronic device 100, and is transmitted to the authentication server 120 via the network 110.

The authentication server 120 having received the authentication request from the electronic device 100 transmits a challenge signal to the electronic device 100 (Step S102). As described above, the challenge signal includes a code that enables the authentication server 120 to read ID data from the electronic device 100. The CPU 101 of the electronic device 100 analyzes the input challenge signal, and outputs a command for generating ID data to the security/authentication circuit 106 based on the code included in the challenge signal. The security/authentication circuit 106 accesses the PUF circuit 107 to cause it to generate ID data according to the generation command, and acquires the generated ID data from the PUF circuit 107 (Step S103). The ID data acquired by the security/authentication circuit 106 is transmitted to the authentication server 120 on the network 110 as a response signal by the CPU 101 having executed the code included in the challenge signal (Step S104). The response signal includes identification information for uniquely identifying the electronic device 100.

The authentication server 120 then performs a predetermined process on the ID data included in the response signal extracted from the electronic device 100 using the registered ID registered in the ID storage unit 130 (Step S105). The predetermined process described here is a part of the process described in the evaluation methods described above, and details thereof are described with reference to FIG. 6.

The authentication server 120 then determines whether the number of extractions of pieces of ID data (responses) from the electronic device 100 has reached a predetermined number of repetitions, that is, whether a predetermined number of pieces of ID data (response signals) have been received from the electronic device 100 (Step S106), and if the number of extractions has not reached the predetermined number of repetitions (NO at Step S106), the authentication server 120 returns to Step S102 and performs the subsequent operations. On the other hand, if the number of extractions has reached the predetermined number of repetitions (YES at Step S106), the authentication server 120 performs ID authentication using the processing results by Step S105 (Step S107). Subsequently, the authentication server 120 notifies the electronic device 100 of the ID authentication result by Step S107 (Step S108), and ends the present operations. Detailed operations at Step S106 are described with reference to FIG. 6.

Next, a more specific operation example of the authentication server 120 in operations illustrated in Steps S102 to S107 in FIG. 5 is described. In FIG. 6, Steps S1021 to S1023 correspond to Step S102 in FIG. 5, Steps S1051 to S1056 correspond to Step S105 in FIG. 5, Step S1061 corresponds to Step S106 in FIG. 5, and Steps S1071 to S1074 correspond to Step S107 in FIG. 5.

As illustrated in FIG. 6, in the operations at Steps S102 to S107 in FIG. 5, the authentication server 120 first resets a value k (k=0) of a counter for counting the number of repetitions of extractions of pieces of ID data (Step S1021). The authentication server 120 then transmits a challenge signal to the electronic device 100 (Step S1022) and increments the counter value k by one (Step S1023).

The authentication server 120 then waits until the authentication server 120 receives a response signal transmitted from the electronic device 100 at Step S104 in FIG. 5 (NO at Step S1051). Upon reception of the response signal (YES at Step S1051), the authentication server 120 counts the number D1 of "1" in a piece of ID data included in the received response signal (Step S1052). The authentication server 120 then compares the number D1 counted at Step S1052 with the number D0 of "1" in the registered ID registered in the ID storage unit 130 (Step S1053), and if the number D1 is equal to or smaller than the number D0 (NO at Step S1054), the authentication server 120 outputs "0" as an index value for the piece of ID data received at Step S1051 (Step S1055). On the other hand, if the number D1 is greater than the number D0 (YES at Step S1054), the authentication server 120 outputs "1" as an index value for the piece of ID data received at Step S1051 (Step S1056). The output index value is associated with, for example, the identification information for uniquely identifying the piece of ID data received at Step S1051 and is held in a memory (not illustrated) or the like.

The authentication server 120 then determines whether the counter value k has reached the upper limit value k_max of the number of repetitions of extractions of the pieces of ID data (Step S1061), and if the value k has not reached the upper limit value k_max (NO at Step S1061), the authentication server 120 returns to Step S1022 and performs the subsequent operations. On the other hand, if the value k has reached the upper limit value k_max (YES at Step S1061), the authentication server 120 proceeds to Step S1071.

At Step S1071, the authentication server 120 performs a statistical test on a data string of index values obtained by repeating processes at Step S1022 to Step S1056 for a predetermined number of times (k_max), thereby acquiring a P value indicating the randomness of the plurality of pieces of ID data received from the electronic device 100. The authentication server 120 then evaluates the P value acquired at Step S1071. Specifically, the authentication server 120 determines, for example, whether the P value is greater than a predetermined threshold (for example, 0.01) (Step S1072). As a result of this determination, for example, if the P value is greater than the predetermined value (0.01) (YES at Step S1072), the authentication server 120 determines that the pieces of ID data are physical random numbers around the registered ID, recognizes that authentication of the electronic device 100 has succeeded (Step S1073), and subsequently proceeds to Step S108 in FIG. 5. On the other hand, if the P value is equal to or smaller than the predetermined value (0.01) (NO at Step S1072), the authentication server 120 determines that the pieces of ID data are not physical random numbers, recognizes that authentication of the electronic device 100 has failed (Step S1074), and subsequently proceeds to Step S108 in FIG. 5.

At Step S1072 in FIG. 6, while the threshold of the P value for determining a success of authentication or a failure of authentication is set at 0.01, the threshold is not limited thereto, but can be variously changed according to the authentication accuracy and the like required in the authentication system 1.

Figure 7:
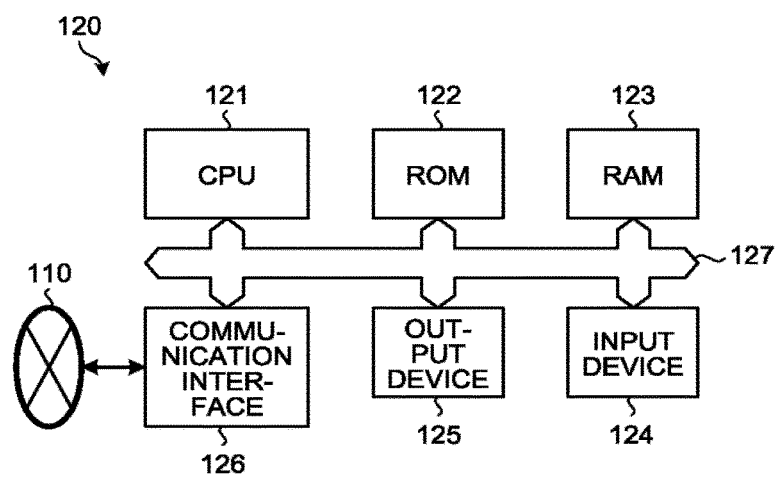
FIG. 7 is a block diagram illustrating an example of the authentication server according to the first embodiment.

The operations of the authentication server 120 described above can be achieved by the CPU (processing unit) 121 in the authentication server 120 having a general configuration as a computer system, for example, as illustrated in FIG. 7, by reading out a program for performing the operations illustrated in FIG. 6, by using a Read Only Memory (ROM) 122 or the like to execute the program. As a configuration example of the authentication server 120, FIG. 7 exemplifies a configuration in which a CPU 121, a ROM 122, a Random Access Memory (RAM) 123, an input device 124, an output device 125, and a communication interface 126 are connected to each other using an internal bus 127. However, the configuration of the authentication server 120 is not limited thereto, and various types of servers can be applied.

Next, an example of the randomness test method according to the first embodiment is described. As a general randomness test method, there is a method 'NIST Publication 800-22 (hereinafter, "SP800-22")' disclosed by the National Institute of Standards and Technology (NIST). The SP800-022 includes a test of 16 items indicated in the following (1) to (16).

(1) Frequency (Monobit) Test
(2) Frequency Test within a Block
(3) Runs Test
(4) Test for the Longest Run of Ones in a Block
(5) Binary Matrix Rank Test
(6) Discrete Fourier Transform (Spectral) Test
(7) Non-overlapping Template Matching Test
(8) Overlapping Template Matching Test
(9) Maurer's "Universal Statistical" Test
(10) Lempel-Ziv Compression Test
(11) Linear Complexity Test
(12) Serial Test
(13) Approximate Entropy Test
(14) Cumulative Sums (Cusum) Test
(15) Random Excursions Test
(16) Random Excursions Variant Test In addition, as another randomness test method, there is a method called the Diehard test. The Diehard test includes a test of 12 items indicated in the following items (1) to (12), and any randomness tests among these can be used.

(1) Birthday spacings
(2) Overlapping permutations
(3) Ranks of matrices
(4) Monkey tests
(5) Count the is
(6) Parking lot test
(7) Minimum distance test
(8) Random spheres test
(9) The squeeze test
(10) Overlapping sums test
(11) Runs test
(12) The craps test The advantage of using the randomness test method described above is that the randomness can be determined by using a P value, which is a quantitative value. The randomness test method is not limited to those methods described above, and various randomness test methods can be used. For example, it is also possible to use a test method disclosed in D. E. Knuth, "The Art of Computer Programming" (Addison-Wesley, 1997, ISBN 978-0201896848) and the like.

Figure 8:
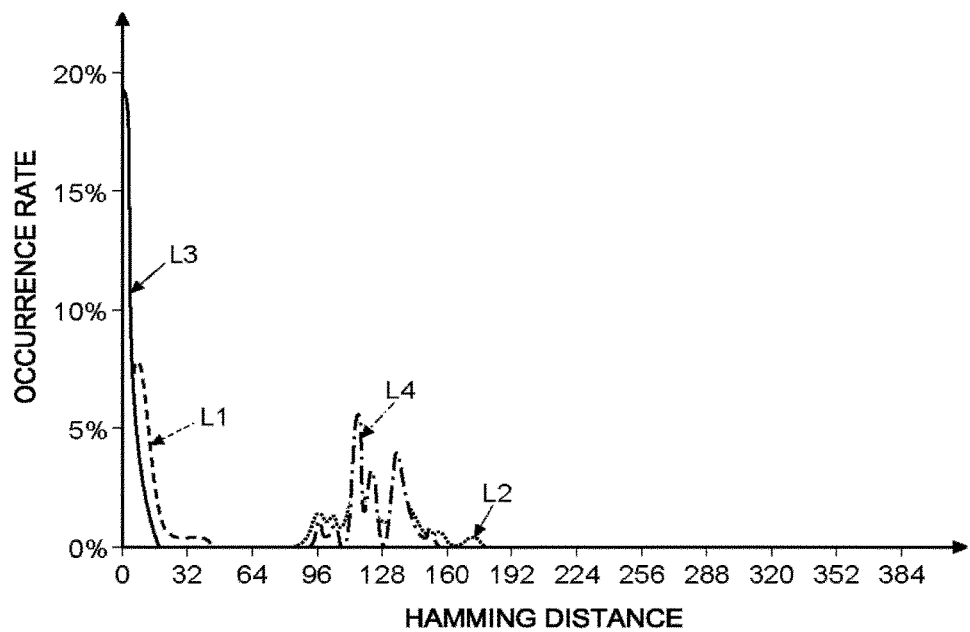
FIG. 8 is a diagram illustrating an example of data of an experiment in which Hamming distances of pieces of ID data with respect to a registered ID are measured in the first embodiment.

FIG. 8 illustrates an example of data of an experiment in which the electronic device 100 and the PUF circuit 107 are an FPGA and a ring oscillator PUF, respectively, and Hamming distances of pieces of ID data with respect to a registered ID are measured. In FIG. 8, the horizontal axis indicates a Hamming distance, and the vertical axis indicates an occurrence rate of ID data having a corresponding Hamming distance. In addition, in FIG. 8, lines L1 and L2 indicate a case where one piece of ID data with respect to the registered ID is a target, and lines L3 and L4 indicate a case where a majority is decided among 100 pieces of ID data with respect to the registered ID. Further, in FIG. 8, the lines L1 and L3 indicate a case where an FPGA having generated the registered ID matches an FPGA having generated pieces of ID data, and the lines L2 and L4 indicates a case where these FPGAs differ from each other.

As illustrated in FIG. 8, when the FPGA having generated the registered ID matches the FPGA having generated the pieces of ID data (see the lines L1 and L3), the occurrence rate of ID data is concentrated near a Hamming distance of 0. Further, the occurrence rate of ID data of the line L3 is more concentrated near a Hamming distance of 0 than the line L1. Because an ideal measurement result when both FPGAs are identical is that the Hamming distances of all pieces of ID data become 0, the experimental data illustrated in FIG. 8 indicates that the reliability of a PUF becomes higher when a majority is determined among a plurality of pieces of ID data.

Further, FIG. 9 and FIG. 10 illustrate test results of a random walk when the items (14) and (16) among the 16 items of the test of the SP800-22 described above are applied to pieces of ID data that have been processed according to the second test method of the evaluation methods described in the first embodiment. In order to measure the test results illustrated in FIG. 9 and FIG. 10, 12 ring oscillator PUFs (RO-PUF 1 to RO-PUF 12) are implemented in different FPGAs.

FIG. 9 illustrates an example of test results when an FPGA having generated a registered ID matches an FPGA having generated ID data, and FIG. 10 illustrates an example of test results when these elements do not match each other. In addition, in FIG. 9 and FIG. 10, "P" indicates a P value obtained by the Cumulative Sums (Cusum) Test in the item (14), and six numbers after "Prev" indicate P values obtained by the Random Excursions Variant Test in the item (16). First, as illustrated in FIG. 9, when the FPGA having generated the registered ID match the FPGA having generated the ID data, P values become sufficiently greater than 0 in both of the items (14) and (16). In contrast thereto, as illustrated in FIG. 10, when the FPGA having generated the registered ID does not match the FPGA having generated the ID data, the P values become values near 0 in both of the items (14) and (16).

Accordingly, the authentication method according to the first embodiment has a configuration in which P values are used when authentication of the electronic device 100 is performed at Step S1072 in FIG. 6.

Here, the Random Excursions Variant Test in the item (16) of the SP800-22 is a test that can be easily integrated in the authentication server 120. That is, the test (16) evaluates a set S represented by the following formula (1) obtained by adding "0" before and after a data string of evaluation target values "−1, 0, 1, 2, . . . ", which has been acquired in the process of the second evaluation method.

$$S=\{0,-1,0,1,2,\ldots,0\} \tag{1}$$

Here, assuming that the number of occurrences of a value x in the set S is x, and that the number of occurrences of a pattern starting from a value 0 and returning to the value 0 when the set S is viewed from the left is J, the P value can be calculated by the following formula (2).

$$P \text{ value} = \text{erfc}\left(\frac{|\xi(x) - J|}{\sqrt{2J(4|x| - 2)}}\right) \tag{2}$$

Figure 11:
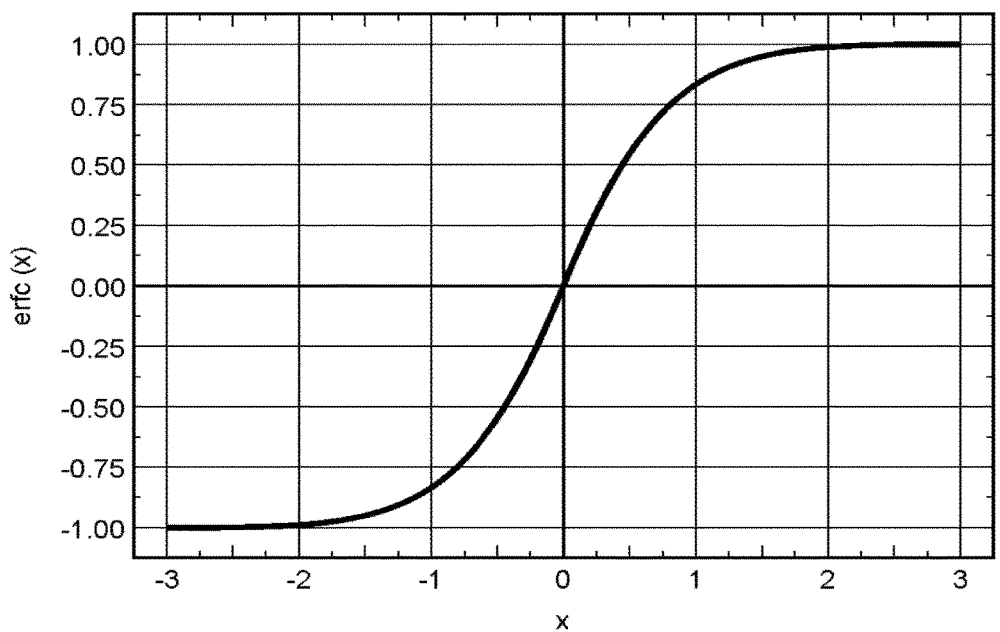
FIG. 11 is a graph representing an error function.

Here, an error function erfc is represented by the following formula (3), and a graph of the error function erfc is as illustrated in FIG. 11.

$$\text{erfc}(x) = \frac{2}{\sqrt{\pi}} \int_x^\infty e^{-u^2} du \tag{3}$$

As described above, the value of the P value for deciding a success or failure of authentication can be obtained by using a simple technique of calculating the following formula (4).

$$\frac{|\xi(x) - J|}{\sqrt{2J(4|x| - 2)}} \tag{4}$$

As described above, in the first embodiment, by performing a randomness test on differences between a registered ID and pieces of ID data, the randomness of the pieces of ID data is evaluated, and ID authentication is performed based on the evaluation result. Due to this configuration, it becomes possible to perform highly accurate ID authentication by using a relatively small number of pieces of data for majority decision (a plurality of pieces of ID data). Further, because various test methods can be applied as the randomness test method according to the first embodiment, it is possible to establish a most suitable authentication system 1 corresponding to the performance of the authentication server 120, the characteristics of the electronic device 100, the environment of the network 110, and the like. Furthermore, for example, by storing a table for the randomness test in the authentication server 120 in advance and causing the authentication server 120 to compare the difference of ID data with the table during ID authentication, it is also possible to achieve the authentication system 1 that can perform ID authentication in a short time. In addition, for example, by using a spectrum test according to a linear congruential method as a randomness test of a plurality of pieces of ID data, it is possible to reduce the circuit scale.

Second Embodiment

Next, an authentication server, an authentication system, and an authentication method according to a second embodiment are described.

Because the electronic device 100 as an object to be authenticated is degraded due to use or the like, an ID itself appropriate for authentication may change. In such a case, because the difference between a registered ID generated and registered before degradation and ID data generated after degradation increases depending on the development of degradation, there is a possibility that the value of a P value and the like to be calculated by the method exemplified in the first embodiment changes depending on the development of degradation, resulting in inhibition of accurate authentication and reduction in the authentication accuracy. Accordingly, in the second embodiment, there is described a configuration for suppressing reduction of the authentication accuracy due to degradation of the electronic device.

As a method for suppressing reduction of the authentication accuracy due to change of the value of a P value and the like depending on the degree of degradation of the electronic device 100, it is possible to adopt a method of updating, periodically or each certain number of uses, a registered ID that is registered in the ID storage unit 130 on the authentication server 120 for authenticating the electronic device 100. Determination as to whether to permit updating of the registered ID can be made based on whether authentication using the current registered ID has succeeded, or can be made, in addition to or apart from this authentication, by requesting a password to a user via the electronic device 100.

In addition, as another method for suppressing reduction of authentication accuracy due to change in a value of a P value and the like depending on the degree of degradation of the electronic device 100, it is also possible to adopt a method of identifying a change trend of a piece of ID data measured on a per authentication basis (for example, a most frequent data pattern decided by a majority decision taken among a plurality of pieces of ID data generated in one authentication), predicting, based on this change trend, the range of the value of a P value and the like, obtained from pieces of ID data generated in new authentication, and deciding a success or failure of authentication based on, as one decision-making factor, whether the value is within a prediction range. Such a prediction of change in the range of the value due to degradation can be achieved by constructing a degraded model unique to the electronic device 100. For example, a degradation model can be constructed by accumulating the time at which authentication has been performed and a time period that has been required for the authentication on the authentication server 120. In this example, the time period required for authentication can be, for example, the number of repetitions or the like that has been required to take a majority decision among a plurality of pieces of ID data. By predicting degradation of the electronic device 100 using such experimental data, it is possible to design more accurate ID authentication.

Third Embodiment

Next, an authentication server, an authentication system, and an authentication method according to a third embodiment are described.

For example, in the first and the second evaluation methods exemplified in the first embodiment, error correction codes such as Bose-Chaudhuri-Hocquenghem (BCH) codes and Reed-Solomon (RS) codes can be used simultaneously. In this case, for example, evaluation is performed according to the same method as the method described above, after replacing a plurality of pieces of ID data generated in the electronic device 100 with the corresponding results obtained by encoding the plurality of pieces of ID data, and replacing the registered ID controlled on the authentication server 120 with the result obtained by encoding this registered ID.

Further, when the Internet and the like is applied as the network 110, a Fuzzy Extractor that can enhance the confidentiality of data such as a random number can be also used simultaneously, in order to improve the security of the authentication system 1. In this case, processing is performed on original data that is obtained by eliminating a random number for a mask used in the Fuzzy Extractor from ID data transmitted from the electronic device 100 to the authentication server 120.

Fourth Embodiment

Figure 12:
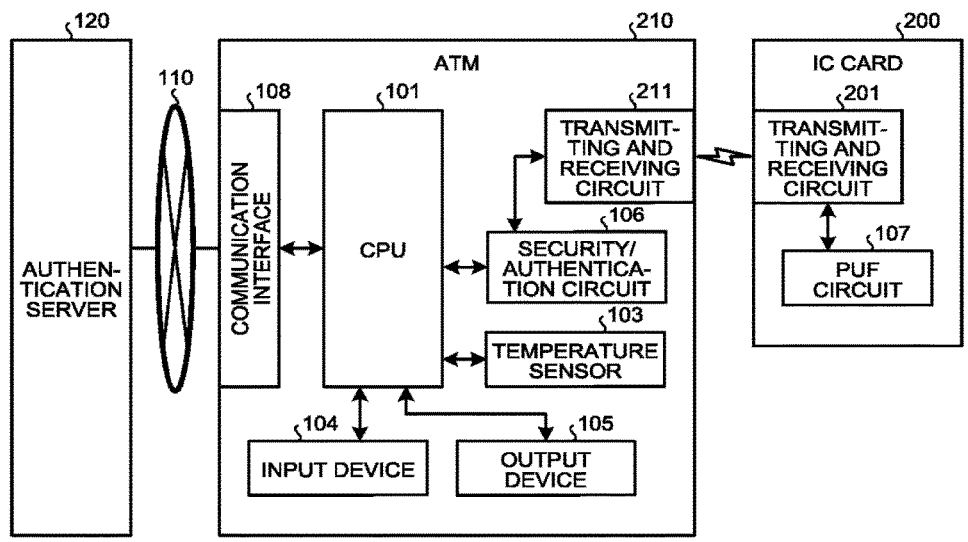
FIG. 12 is a block diagram illustrating an example of an authentication system according to a fourth embodiment.

Next, an example of use of the authentication system 1 according to the above embodiments is described in detail below with reference to the drawings. FIG. 12 illustrates a schematic configuration example in a case where the authentication system 1 is applied to an Automated Teller Machine (ATM). In the configuration illustrated in FIG. 12, the electronic device 100 according to the above embodiments is constituted by an IC card 200 and an ATM 210. The IC card 200 has, in addition to the PUF circuit 107 in the electronic device 100 illustrated in FIG. 1, a transmitting and receiving circuit 201 for transmitting pieces of ID data generated in the PUF circuit 107 to the ATM 210. Meanwhile, the ATM 210 includes a transmitting and receiving circuit 211 for receiving the ID data transmitted from the IC card 200, in addition to the CPU 101, the temperature sensor 103, the input device 104, the output device 105, the security/authentication circuit 106, and the communication interface 108 in the electronic device 100 illustrated in FIG. 1.

In the configuration illustrated in FIG. 12, when it is detected that the ID card 200 is brought closer to the transmitting and receiving circuit 211 of the ATM 210, the CPU 101 of the ATM 210 transmits an authentication request to the authentication server 120. In response to this authentication request, the authentication server 120 transmits a challenge signal for extracting ID data of the IC card 200 to the ATM 210. This challenge signal includes a code that enables the authentication server 120 to read ID data from the ATM 210. The CPU 101 of the ATM 210 having received the challenge signal outputs a command for generating ID data to the security/authentication circuit 106. The security/authentication circuit 106 accesses the PUF circuit 107 of the IC card 200 via the transmitting and receiving circuit 211 according to the generation command, and causes the PUF circuit 107 to generate ID data. The ID data generated in the PUF circuit 107 of the IC card 200 is transmitted to the security/authentication circuit 106 of the ATM 210 via the transmitting and receiving circuit 201 and then input to the CPU 101 from the security/authentication circuit 106. The CPU 101 transmits, as a response signal, the ID data to the authentication server 120 according to the code included in the challenge signal. Due to this configuration, the ID data generated in the IC card 200 is extracted by the authentication server 120. Extraction (a response) of the ID data by the authentication server 120 is repeated a predetermined number of times. Due to this configuration, the authentication server 120 acquires a plurality of pieces of ID data from the IC card 200.

A registered ID predicted from degradation change taking into consideration of, for example, the number of times of reading and the number of times of writing, is registered in the authentication server 120A. The authentication server 120 evaluates the distribution of a plurality of pieces of ID data extracted from the IC card 200, thereby performing authentication of the IC card 200.

Figure 13:
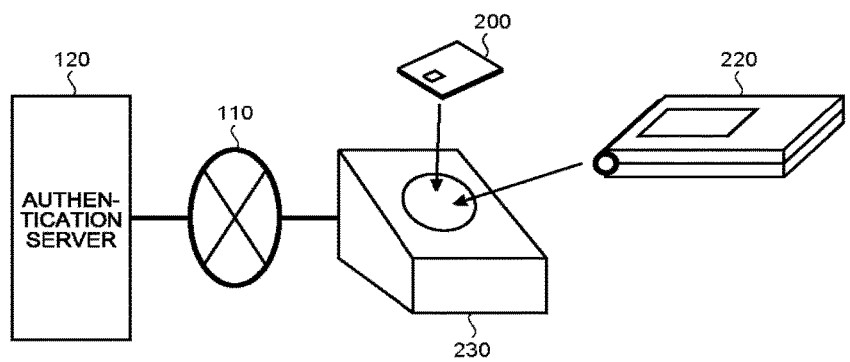
FIG. 13 is a diagram illustrating another example of the authentication system according to the fourth embodiment.

Further, the authentication system 1 according to the above embodiments is not limited to the ATM system illustrated in FIG. 12, and can be variously modified. For example, as illustrated in FIG. 13, it is also possible to use any type of mobile terminal 220 including, for example, a mobile phone, a smartphone, and a tablet PC, in place of the IC card 200 in the configuration illustrated in FIG. 12. It is also possible to use a mobile reader 230 that can acquire information from the mobile terminal 220 or the IC card 200, in place of the ATM 210 illustrated in FIG. 12.

Other configurations, operations, and effects of the fourth embodiment are identical to those of the embodiments described above, and thus detailed descriptions thereof will be omitted.

Fifth Embodiment

Figure 14:
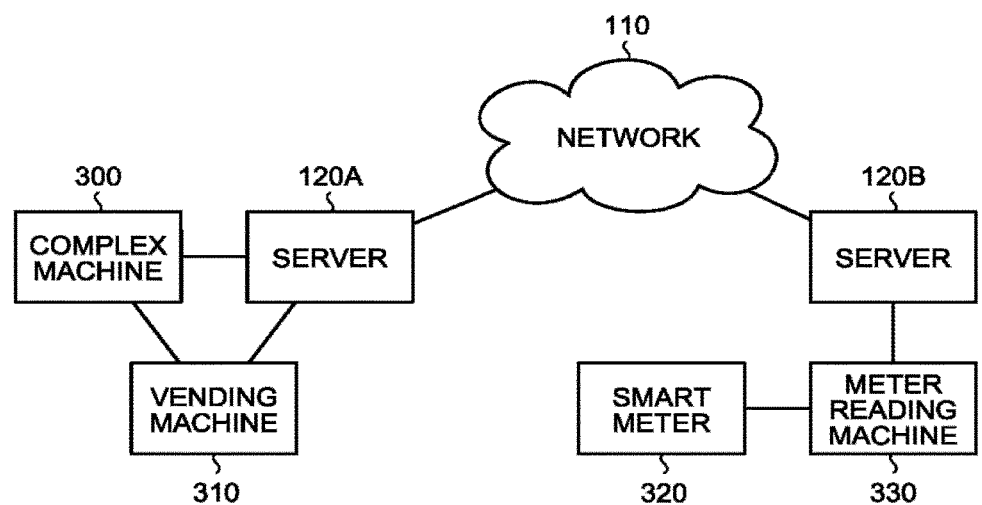
FIG. 14 is a diagram illustrating an example of an authentication system according to a fifth embodiment.

Next, another example of use of the authentication system 1 according to the above embodiments is described in detail below with reference to the drawings. FIG. 14 is a diagram illustrating an example where the authentication system 1 according to the above embodiments is applied to machine-to-machine (M2M) mutual authentication. The example illustrated in FIG. 14 is an example where the authentication system 1 according to the above embodiments is applied to mutual authentication between a server 120A and a network-ready complex machine 300, the server 120A and a network-ready vending machine 310, the network-ready complex machine 300 and the network-ready vending machine 310, a smart meter 320 such as an electricity meter and a gas meter and a meter reading machine 330, and the meter reading machine 330 and a server 120B, as well as authentication between the server 120A and the server 120B.

In this configuration, the servers 120A and 120B correspond to the authentication server 120 in the above embodiments. With regard to the server 120A, the complex machine 300 and the vending machine 310 correspond to the electronic device 100 in the above embodiments. With regard to the server 120B, the smart meter 320 and the meter reading machine 330 correspond to the electronic device 100. In a case of authentication between servers, one of the servers 120A and 120B is operated as the authentication server 120 in the above embodiments, and the other one is operated as the electronic device 100. Further, at the time of authentication between the complex machine 300 and the vending machine 310 and authentication between the smart meter 320 and the meter reading machine 330, for example, the complex machine 300 and the meter reading machine 330 are operated as the authentication server 120, and the vending machine 310 and the smart meter 320 are operated as the electronic device 100. In each of the machines 300 to 330, wireless or radio-wave authentication processing can be performed.

Other configurations, operations, and effects of the fourth embodiment are identical to those of the embodiments described above, and thus detailed descriptions thereof will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An authentication server comprising a processing unit that performs authentication of an electronic device including a PUF circuit generating a piece of ID data, wherein
the processing unit
performs statistical processing on a plurality of pieces of ID data acquired from the electronic device,
determines whether the plurality of pieces of ID data are physical random numbers based on a result of the statistical processing, and
when the plurality of pieces of ID data are determined to be physical random numbers, recognizes a result of authentication of the electronic device as a success of authentication, and when the plurality of pieces of ID data are determined not to be physical random numbers, recognizes the result of authentication of the electronic device as a failure of authentication.

2. The authentication server according to claim 1, wherein the processing unit
outputs a challenge signal for acquiring the plurality of pieces of ID data from the electronic device in response to an authentication request from the electronic device, and
when the plurality of pieces of ID data are determined to be physical random numbers, notifies the result of the success of authentication to the electronic device, and when the plurality of pieces of ID data are determined not to be physical random numbers, notifies the result of the failure of authentication to the electronic device.

3. The authentication server according to claim 1, wherein the processing unit determines whether the plurality of pieces of ID data are physical random numbers based on differences of the plurality of pieces of ID data with respect to a registered ID registered in advance as an ID for uniquely identifying the electronic device.

4. The authentication server according to claim 3, wherein the registered ID is a most frequent data pattern decided by a majority decision among the plurality of pieces of ID data notified from the electronic device in advance.

5. The authentication server according to claim 3, wherein the processing unit determines whether the plurality of pieces of ID data are physical random numbers by performing a randomness test based on a random walk with respect to the differences of the plurality of pieces of ID data.

6. The authentication server according to claim 1, wherein
the statistical processing includes a statistical test that acquires a statistical amount representing randomness of the plurality of pieces of ID data, from the plurality of pieces of ID data, and
the processing unit determines whether the plurality of pieces of ID data are physical random numbers based on the statistical amount.

7. The authentication server according to claim 6, wherein
the processing unit records therein, periodically or each certain number of uses of the electronic device, a most frequent data pattern decided by a majority decision among a plurality of pieces of ID data acquired from the electronic device, and
at a time of authenticating the electronic device, the processing unit
identifies a change trend of the most frequent data pattern,
identifies, based on the change trend, a prediction range of a statistical amount that is obtained from pieces of ID data that are supposed to be acquired from the electronic device during the authentication,
acquires a statistical amount from a plurality of pieces of ID data actually acquired from the electronic device during the authentication, and
when the statistical amount acquired from the actually acquired plurality of pieces of ID data is within the prediction range, determines that the actually acquired plurality of pieces of ID data are physical random numbers.

8. An authentication system comprising:

an electronic device that includes a PUF circuit generating a piece of ID data; and an authentication server that performs authentication of the electronic device using the ID data, wherein the authentication server transmits a challenge signal for acquiring a plurality of pieces of ID data to the electronic device, performs statistical processing on the plurality of pieces of ID data acquired from the electronic device in response to the challenge signal, determines whether the plurality of pieces of ID data are physical random numbers based on a result of the statistical processing, and when the plurality of pieces of ID data are determined to be physical random numbers, recognizes a result of authentication of the electronic device as a success of authentication, and when the plurality of pieces of ID data are determined not to be physical random numbers, recognizes the result of authentication of the electronic device as a failure of authentication, and the electronic device generates the plurality of pieces of ID data in response to the challenge signal received from the authentication server, and transmits a response signal including the generated plurality of pieces of ID data to the authentication server.

9. An authentication method performed by an authentication server that performs authentication of an electronic device, where the electronic device including a PUF circuit generating a plurality of pieces of ID data, the method comprising:

acquiring the plurality of pieces of ID data from the electronic device;

performing statistical processing on the acquired plurality of pieces of ID data;

determining whether the plurality of pieces of ID data are physical random numbers based on a result of the statistical processing; and when the plurality of pieces of ID data are determined to be physical random numbers, recognizing a result of authentication of the electronic device as a success of authentication, and when the plurality of pieces of ID data are determined not to be physical random numbers, recognizing the result of authentication of the electronic device as a failure of authentication.

* * * * *